United States Patent [19]

Gunn

[11] Patent Number: 5,276,276
[45] Date of Patent: Jan. 4, 1994

[54] COIL TRANSDUCER

[76] Inventor: Dennis R. Gunn, Ota-ku, Yukigaya-Otsuka 16-20, Tokyo 145, Japan

[21] Appl. No.: 286,215

[22] Filed: Dec. 19, 1988

Related U.S. Application Data

[63] Continuation-in-part of Ser. No. 220,244, Jul. 18, 1988, abandoned.

[51] Int. Cl.$^5$ .......................... G01H 3/14; G01H 3/00
[52] U.S. Cl. ........................................ 84/725; 84/723; 84/743
[58] Field of Search .. 84/1.14–1.16; DIG. 12, DIG. 3; 381/177, 199, 192, 194, 201; 336/110, 136, 30

[56] References Cited

U.S. PATENT DOCUMENTS

| | | | |
|---|---|---|---|
| 2,984,140 | 5/1961 | Barron | 84/1.15 X |
| 3,571,483 | 3/1971 | Davidson | 84/1.15 X |
| 3,657,461 | 4/1972 | Freeman | 84/1.15 |
| 3,725,561 | 4/1973 | Paul | 84/1.15 |
| 4,010,334 | 3/1977 | Demeter | 381/199 |
| 4,145,944 | 3/1979 | Helpinstill, II | 84/1.15 X |
| 4,230,013 | 10/1980 | Wellings | 84/1.14 |
| 4,237,347 | 12/1980 | Burundukov et al. | 381/192 X |
| 4,495,641 | 1/1985 | Vernino | 84/1.14 X |
| 4,765,321 | 8/1988 | Mohri | 381/177 X |
| 4,837,836 | 6/1989 | Barcus | 84/1.14 X |

Primary Examiner—A. T. Grimley
Assistant Examiner—Matthew S. Smith

[57] ABSTRACT

In a contact mike, a pair of coils are formed so as to be directly connected to the resonating surface of a musical instrument or other vibrating object. The coils are coaxial and oppositely wound such that a single space is defined at their common center. A magnet is resiliently suspended within the coils and is resiliently isolated from the vibration of the resonating surface. Since the coils vibrate in the vicinity of the magnet, which remains relatively stationary due to its own inertia, an alternating current is induced in the coils which anologues the vibrations of the surface. In one embodiment the resonating member of the instrument itself is used to form part of the resilient connection between the magnet and the coil.

29 Claims, 13 Drawing Sheets

COIL TRANSDUCER

This is a continuation in part to U.S. patent application Ser. No. 07/220,244 filed Jul. 18, 1988 now abandoned.

The present invention elates generally to a method and apparatus for producing an alternating electrical current signal corresponding to the vibrations of a kinetically excited member such as a vibrating surface of a musical instrument. More specifically, the current invention relates to a novel configuration of transducer which may be advantageously employed as either a contact microphone or integrally formed on a resonating member of a musical instrument.

BACKGROUND

In the art of microphones, a coil caused to vibrate in the vicinity of a magnet has long served as the means for generating an electrical signal that analogues the acoustical vibrations to be picked up. In traditional contact microphones, the coil is attached to a diaphram at the end of an eustuchian tube whose other end is attached to the surface to be miked. Such devices work well but are rather fragile and expensive.

In more recent contact microphones coils and magnets have been for the most part replaced by piezo-electric elements which when stressed, produce an electrical output which varies depending on the stress, thus producing an A.C. signal output that analogues the vibrations of the resonating member to which the microphone is attached. This type of microphone has the advantages of being very simple and fairly small and light. A disadvantage of this type of microphone however is that since the output is rather small and the low frequency response is generally weak, a pre-amp of some description is almost always required for boosting the signal and for equalization. Such pre-amps are an added expense, are bulky and require a power source. Another disadvantage of piezo electric micophones is that due to the vagueries of the piezo electric elements a "flat" response giving a signal which accurately coresponds to the vibrations of the miked surface is difficult to obtain. Yet another disadvantage of this type of microphone is that in actual practice arranging the microphone in such a manner as to be stressed adequately to produce a strong signal is difficult. Sometimes increasing the pressure engaging the mike to the surface increases the output of the mike however this results in the problem the vibrating characteristics of the surface become altered due to the extra force.

BRIEF SUMMARY OF THE INVENTION

The present invention is a novel configuration of coil microphone which overcomes the above problems. According to the basic principles of the instant invention a coil is resiliently coupled to a magnet in such a manner as to be able to vibrate essentially independently thereof and either the coil or the magnet is attached to the surf ace to be miked so as to vibrate therewith and the other of the two members is attached only through the resilient coupling and therefore due to its own inheriant inertia remains relatively stationary while the member that is attached to the surf ace vibrates therewith. The net effect of this is that the coil and the magnet vibrate relative to each other at the frequency vibration of the surf ace to be miked. The coil and the magnet are arranged in close enough proximity and such that the magnetic force lines of the magnet intersect the windings of the coil and therefore an alternating electrical current proportional to the magnitude frequency and intensity of vibration of the surface is generated in the coil.

In cases where the surface to be miked is that of a musical instrument, since it is usually desirable that the weight of the mike alters the vibrating characteristic as little as possible, generally the lighter of the of the two elements (the coil and the magnet) should be attached to the surface and the heavier should be the sprung mass. In this manner only the effective mass of the lighter member is added to the point on the surface to be miked therefore the effect of the added mass on the surface (lowering of the resonant frequency) is minimized.

Alternatively the resonating surface may be specifically designed to accomodate or benefit from the extra mass of either of the members, or is simply heavy enough that the extra mass does not appreciably alter the resonating characteristics.

In one embodiment the coil is formed of a few hundred turns of extremely fine coil wire and coated with an adhesive which makes it rigid when it sets. A magnet whose outer diameter is smaller than the inside diameter of the coil is suspended within the coil via a flexible diaphram which resiliently allows axial movement of the magnet along the center axis of the coil but restricts movement in other axes. The outer periphery of the diaphram is attached to the coil. An end edge of the coil is formed so as to be engagable with the surface to be miked. A plurality of diaphrams in different parallel planes may be provided so as to restrict the the magnet from swaying side to side within the coil while resiliently allowing axial movement.

In order to increase the intensity of the magnetic field passing through the coil and thereby enhance the signal strength of the transducer an appropriately shaped ferrous yoke may be attached to the magnet.

The long dimension of the magnet along the center axis of the the coil may be smaller than that of the coil so that the coil may vibrate relative to the magnet without the magnet ever being caused to protrude from the end of the coil. In this case the coil may be divided into two separate coils respectively arranged above and below the longitudinal center of the magnet and the polarity of the coils reversed. In this manner phase cancellation in the coil, due to the opposite phase orientations of the magnetic force lines intersecting the coil at the upper and lower portions, is effectively avoided and a strong signal output is assured.

Alternatively a reverse phase effect can be achieved by providing a single coil with a center tap wich may be attached to f or example the hot lead of the amplifier while the two ends of the coil are attached to ground.

A spin off advantage of separating the coil into oppositely phased halves is that radio noise and other outside electromagnetic noises are automatically eliminated from the mike output due to phase cancellation between upper and lower halves of the coil, much in the same manner as humbucking pickups commonly employed in guitars.

The leads of the coil may be connected to an amplifier. The magnet may comprise a center hole so that a vent is formed between the upper and lower sides thereof. A plurality of flexible protruding members may be provided at either side of the coil each of which comprising an adhesive material on a surface thereof and so configured that elastic deformation thereof may bring the surface comprising the adhesive layer into contact with a surface on which the coil is arranged so as to cause the adhesive to adhere to the surface and hold the edge of the coil in engagement with the surface.

In yet another embodiment the coil is formed directly on a resonating member of a musical instrument and the magnet is supported on a separate structural member of the instrument. As in the other embodiments the magnet may be supported on a diaphram. Alternatively the magnet may be supported directly on the structural member with no vibration damper therebetween. In the latter case a second coil may be attached directly to the structural member and a second magnet may be disposed therein as in the first embodiment described, and the signal of the second coil may be added to that of the first. In this way any vibration of the resonating member that is transferred to structural member and therefore to the first magnet causing signal loss in the first coil of frequencies at which the structural member resonates, can be picked up by the second coil and magnet so as to assure that all the frequencies of the resonating member are picked up.

The coil may be formed oblong so as to cover a large portion of the resonating member and accommodate a plurality of magnets. The member on which the magnets are supported within the coil may be comprised of ferrous material so the magnets can magnetically retain themselves thereon thus allowing the magnets to be selectively removed or arranged within the coil so as to emphasize or de-emphasize the distinct resonant characterisics at respective positions within the coil or the magnets may be arranged with their poles facing opposite directions so as to cause phase cancelation within the coil. The ferrous material of the support member may be arranged in separated sections so as to allow the fields of the magnets to remain separately defined.

In yet another alternative embodiment the magnet is supported on the resonating member and the coil is resiliently supported on the magnet.

IN THE DRAWINGS

DETAILED DESCRIPTION

Figure 1:
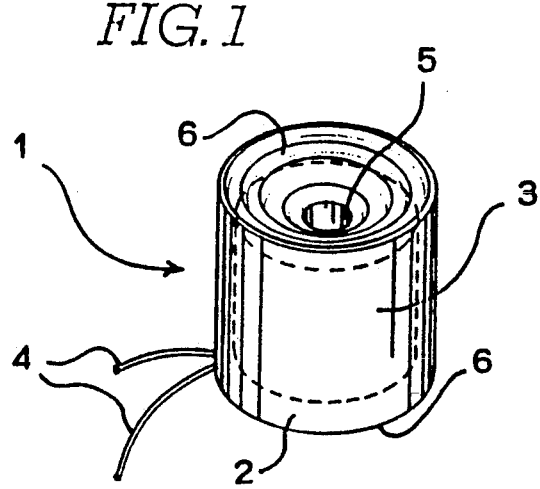
FIG. 1 is a perspective view showing the basic configuration of a transducer according to the first embodiment of the invention.

In FIG. 1 the basic configuration of a microphone 1 according to the first embodiment of the invention is shown. The basic components are a coil 2 comprising leads 4, a magnet 3 and a pair of diaphrams 6. The diaphram 6 elastically supports the magnet 3 within a cylindrical space who's circumferencial periphery is defined by the inner periphery of the coil and who's upper and lower ends are defined by the diaphrams 6.

Preferably the diaphrams 6 have little or no inherent resonance and are elastically deformable so as to allow the magnet 3 to move in the vertical directions but are rigid in the lateral directions so as to prevent the magnet from contacting the coil. The diaphrams 6 may be formed of any appropriate elastic material such as plastic, rubber coated cloth or paper of the type commonly used to support the coils and speaker cones of loudspeakers. etc. The coil 2 may be formed, as is common in loud speaker practice, of helically wrapped laquer insulated wire with a coating of adhesive to give it rigidity. The coil may be coated with a hard setting resin to give it extra rigidity or imbedded in an injection moulded plastic cylinder.

Preferably the coil 2 is divided into separate oppositely phased upper and lower halve 2' and 2". This may be achieved by first winding one of the halves and the then winding the other half in the opposite direction or by providing two discrete upper and lower coils 2' and 2" which can be connected in series or parallel.

It will be appreciated that the principle of dividing the coil into oppositely phased upper and lower halves may be considered to apply to all of the embodiments of the disclosed in the this application exept those where the provision of a ferrous yoke for concentrating the magnetic feild in the coil renders coil splitting unnecessary.

Figure 2:
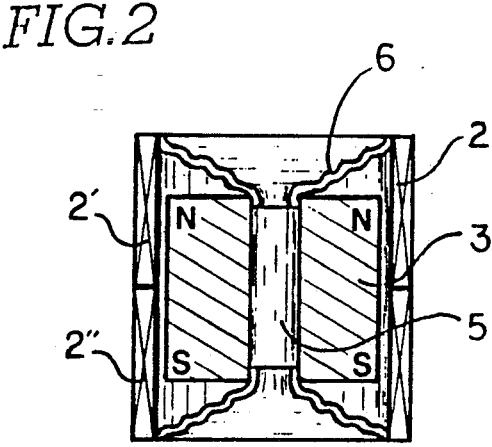
FIG. 2 is a cutaway view of a transducer according to the first embodiment of the invention.

As can be seen in FIG. 2 the diaphrams 6 of the first embodiment are formed as inwardly projecting cones having annular corrugations to make them flexible. The inner diameter of the coil 2 is preferably made as close to the outer diameter of the magnet 3 as possible while still preventing physical contact therebetween. In this way, since the strength of the field of a magnet increases exponentially with proximity, a strong signal can be generated in the coil 2 when it is set into vibration.

The magnet may be formed with a hole 5 through its center which when the microphone is disposed on a surface with an end of the coil engaged thereto serves as a vent between the chamber formed between the surface to be miked and the diaphram 6 in this way air cannot become trapped in this chamber and restrict the movement of the magnet.

Figure 3:
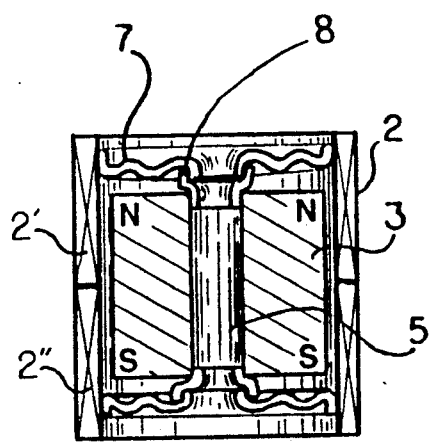
FIG. 3 is a cutaway view of a transducer according to a second embodiment of the invention.

In the second embodiment shown in FIG. 3 the coil 2 and magnet 3 are essentially the same as in the first embodiment however the diaphrams 7 are connected to connector members on the magnet which hold them away from the surface of the magnet and instead of the conical configuration shown in FIG. 2 the diaphrams 7 essentially lie in planes which are defined slightly inwards of the ends of the coil 5. With this configuration the diaphrams 7 can be made a little stiffer in the lateral directions allowing more precise alignment of the magnet within the coil 5 than in the first embodiment.

The microphones of the first two embodiments can be held against the surface to be miked by one sided adhesive tape, non-drying resin or double sided adhesive tape as is common practice in the art.

The inventor however has found that non-setting adhesive tapes or resins disposed between the surface to be miked and the mike tend to form a resilient barrior which prevents some of the very high frequency vibration of the surface from being effectively transmitted to the coil this results in high end roll off in the signal produced by the coil.

Figure 4:
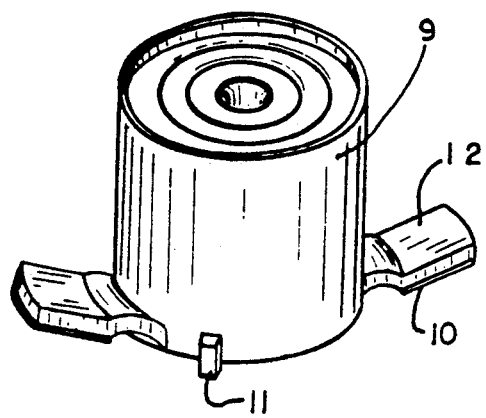
FIG. 4 is a perspective view of a transducer according to a third embodiment of the invention.

In the third embodiment shown in FIG. 4 a means for holding the edge of the coil in engagement with the surface to be miked is provided integrally on the mike.

In the third embodiment the coil, magnet (not shown), and diaphrams are essentially identical to those shown in the embodiment of FIG. 3 however in the third embodiment the coil is embedded in an injection moulded casing 9 which comprises flexible ears 12 which have a re-usable adhesive layer 10 such as two sided adhesive tape disposed on a surface thereof. When the mike is arranged on the surface to be miked the ears may be deformed so as to bring the adhesive into contact with the surface, when the ears are so deformed this causes engaging feet 11 on the casing 9 to be biased into firm, direct engagement with the surface to be miked by the biasing force of the ears. In this way since there is no elastic barrior between the coil and the surface to be miked transferrence of all vibrational frequencies from the surface to the coil can be assured.

Figure 5:
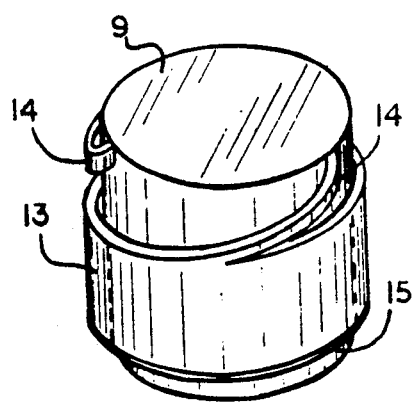
FIG. 5 is a perspective view of a transducer according to a fourth embodiment of the invention.

In a fourth embodiment shown in FIG. 5 instead of the ears used in the embodiment of FIG. 4 an annular member 13 is attached via elastic members 14 to the casing 9 of the coil 2. While the elastic members 14 are in a non-deformed state the end of the coil protrudes beyond the lower surface of the annular member 13. An adhesive layer 15 is formed on the lower surface of the the annular member 13. When the annular member is manually forced into contact with the surface to be miked the adhesive layer 15 is caused to adhere to the surf ace to be miked and the members 14 are elastically deformed so as to bias the lower end of the casing of the coil into engagement with the surface to be miked. Thus as in the third embodiment the coil is held in in engagement with the surface to be miked without any resilient adhesive layer therebetween which might interfere with the transmission of vibration from the the surface to the coil.

Figure 6:
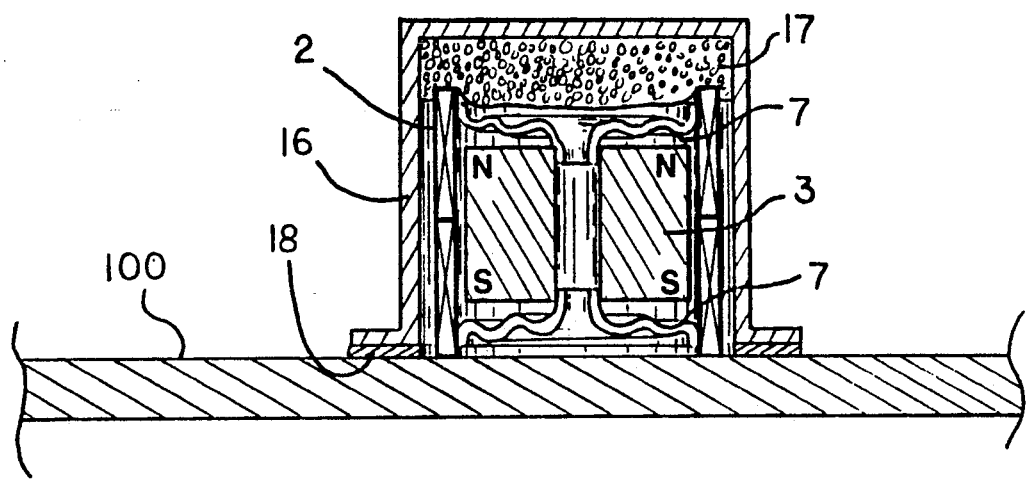
FIG. 6 is a cutaway view of a transducer configuration according to a fifth embodiment of the invention.

In the fifth embodiment shown in cutaway FIG. 6 a cilindrical cap 16 comprising a resilient layer 17 of a substance such as rubber or foam rubber disposed in one end thereof and an adhesive layer 18 on a lower annular surface thereof is provided. A pickup essentially similar to that shown in FIG. 3 is received within the cap 16 the upper surface of the coil 2 is attached to the resilient member 17. The axial dimention of the coil 2 is longer than the distance between the bottom annular surface carrying the adhesive layer 18 and the surface of the resilient member 17 so that while the resilient member 17 is in an undeformed state the lower edge of the coil 2 protrudes from the mouth of the cap. Thus when the cap is brought into engagement with the surface to be miked so as to cause the adhesive layer 18 to adhere to the surface the coil 2 is resiliently urged by the resilient layer 17 into engagement with the surface to be miked.

Figure 7:
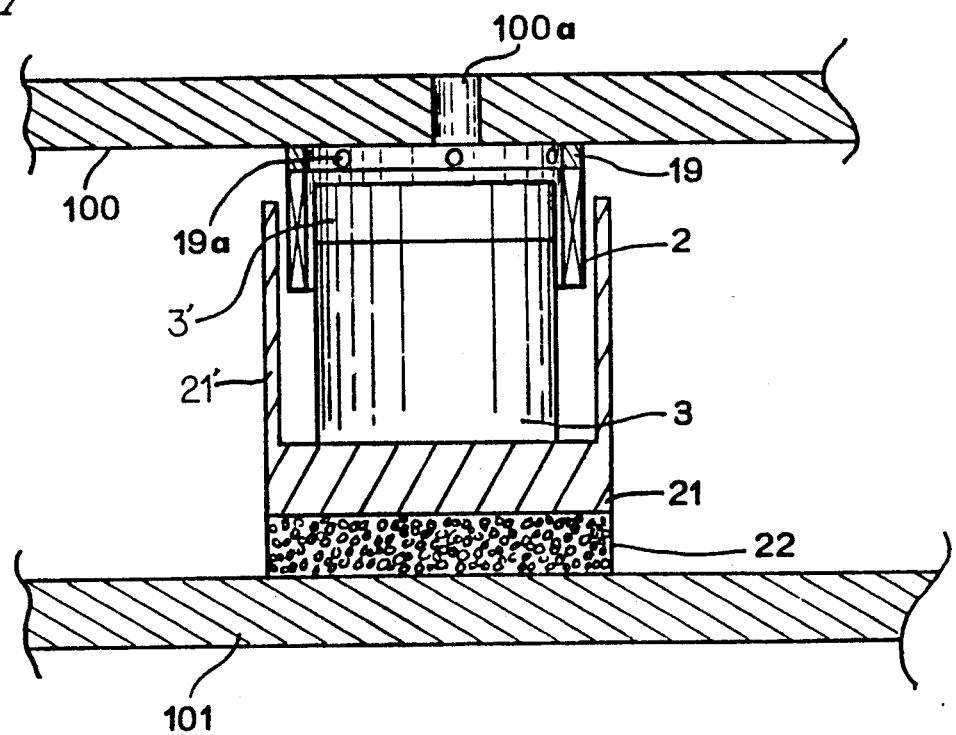
FIG. 7 is a cutaway view of a transducer according to a sixth embodiment of the invention.

In the sixth embodiment shown in FIG. 7 the coil is attached to a ring 19 comprising vent holes 19a and the ring 19 is attached directly to the surface to be miked 100 by attaching means such as hard setting glue. The magnet 3 is supported on a structure 101 separate from the the resonating surface 100 the magnet may be mounted in a yoke 21 supportted on a base comprising a resilient deadening layer 22 made of foam rubber or felt or other appropriate deadening material by which vibration of the structural member 101 can be prevented from being transmitted to the magnet 3 in addition to or instead of the vent holes 19a a vent hole 100a may be formed in the resonating member itself.

The vent holes are optional and are provided so as to prevent pressurization of air in the space in the coil, generated due to the piston-cylinder effect of the magnet within the coil, from damping vibration of the surface to be miked.

The yoke 21 is comprised ferrous material and is generally in the shape of a cap with cylindrical sides. The cylindrical walls of the yoke 21' serve in conjunction with a ferrous disc shaped yoke 3' disposed on the upper end of the magnet to concentrate the magnetic field of the magnet 3 in the coil.

Figure 8:
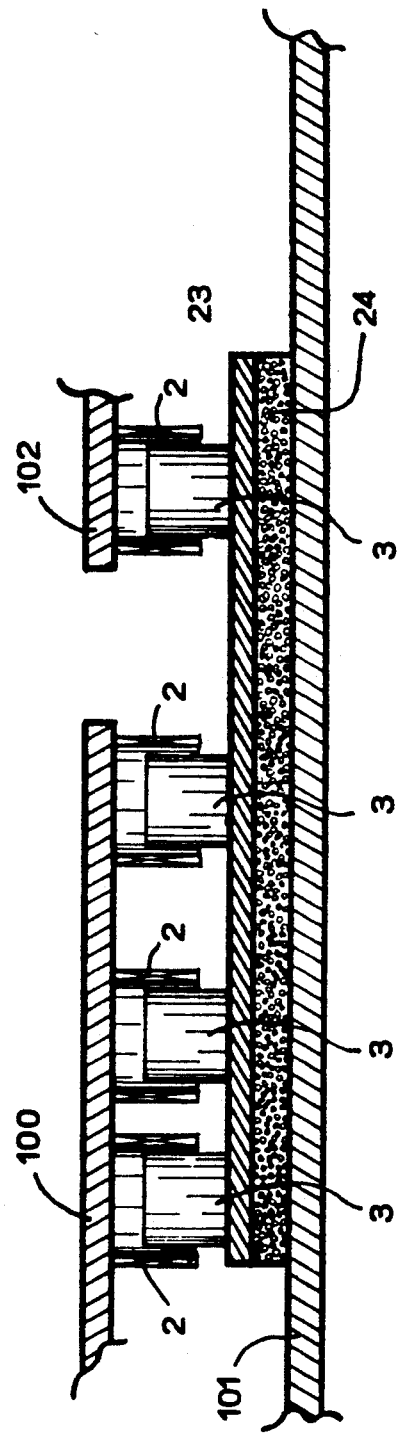
FIG. 8 is a cutaway view of a transducer configuration according to an eighth embodiment of the invention.

The seventh embodiment shown in cutaway in FIG. 8 is essentially the same as the fourth embodiment except that instead of the yoke member 21 and deadening member 22 an extended ferrous member 23 is provided on which a plurality of magnets 3 may be supported so as to protrude into a plurality of coils 2 attached to the surface(s) to be miked. The coils may be wired in series, parallel, or separately and may be provided phase inverting switches so that phase cancelation between the respective coils can be selectively obtained.

As seen in FIG. 7 the coils may be attached to separate vibrating members 100 and 102 so that the vibration characteristics of a plurality of locations on a single member or of plural members may be picked up.

If desired the polarity of the magnets may be arranged opposite so that the coils can be switched or wired out of phase to provide hum cancelation without without producing phase cancelation of the detected vibration of the surface between the signals output from the respective coils 2.

Figure 9:
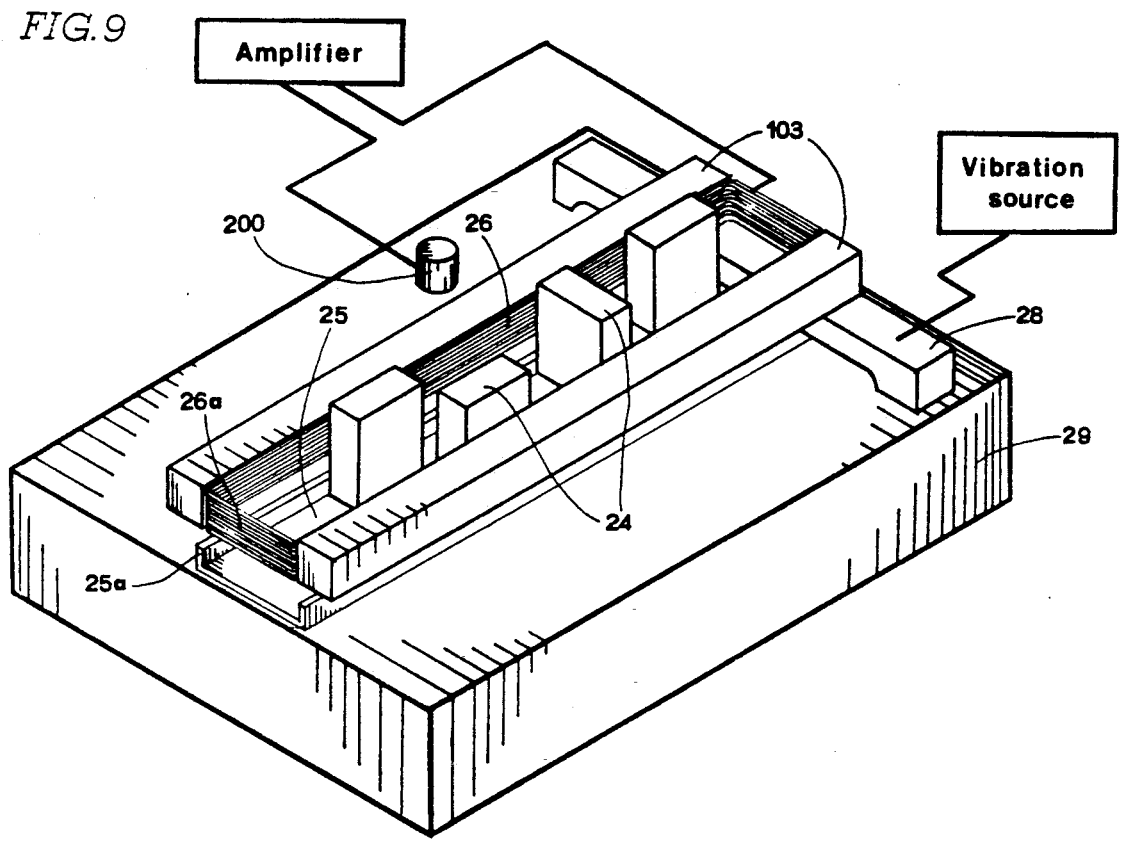
FIG. 9 is an explanatory perspective view showing the principles of a transducer according to the eighth embodiment of the invention.

In the eighth embodiment shown in explanatory FIG. 9 an oblong coil is formed so as to rigidly adhere on opposing faces of resonating members 103 and magnets 24 are suported on a channelled ferrous member 25. The ferrous component of channelled ferrous member 25 may be formed in separated sections. The magnets 24 are parallel piped and are smaller in thickness than the width of the channel within the member 25 so that by adjusting the orientation of the magnet within the channel the proximity of the magnet to the nearest portion of the coil may be selected. Guides 25a of the channel member 25 serve to prevent the magnets from being moved so close to the coil that they may be caused to rub or otherwise contact the coil.

The resonating members 103 are supported on a resonator support member 28 which is supported on a base structure 29. A vibration source (shown schematically) is coupled with the resonator support member to provide a vibration input thereto. The vibration input by the vibration source is modulated by the resonator support member 28 and the resonating members 103. The respective sections of the coil 26 vibrate with the respective sections of the resonating members to which they are attached. The resonating members 103 may be made of any material such as wood for example which provides desired resonating characteristics. Where two resonating members 103 are provided as shown they may have mutually different resonating characterisics the difference in resonating characteristics between the two members may be provided by selective damping with a resilient material such as foam or felt, forming them of different lengths, thicknesses, shapes, materials, etcetera. The section 26a of the coil 26 between the free ends of the resonating members 103 preferably has as little rigidity as possible so that transmission of vibration between the respective members 103 may be avoided. The section 26a of the coil may be dampened with foam or felt (not shown).

It will be noted that with this configuration the arrangement of the magnets within the coil may be changed at will, for example the proximity of the respective magnets to the coil and or the polar orientiation of the magnets may be selected to emphasize the resonating characteristics of selected portions of the coil or produce phase cancelation in the coil. Thus the signal output of the coil 26 can be made to be an electrical signal coresponding to a selectively modulated form of the vibration input to the resonating members by the vibration source.

It will be noted that a portion of the vibration input to the resonator support member will be transmitted therethrough to the base member 29 on which it is supported and since in the pictured embodiment the channel member 25 which supports the magnets 24 is supported directly on the base 29 without the resilient vibration damper shown in the previously described embodiments the vibration of the base member will be transmitted to the magnets. The result of this is that the vibration component common to both the resonating members 103 and the base member 29 will be non present in the signal output from the coil 26 to the amplifier (shown schematically).

In order to provide a signal representing this component to the amplifier a secondary microphone 200 whose construction is essentially similar to that of the microphone of the first embodiment may be attached to the surface of the base 29 and coupled to the amplifier. This arrangement has the advantage that the respective outputs of the coil 26 and the secondary microphone 200 may be mixed at will to provide further control of the characterstics of the signal provided to the amplifier.

Although in the diagram of the eighth embodiment two resonating members 103 are shown the oblong coil may alternatively be formed so as to project from the surface of a single resonating member or may be formed on the walls of a slot in a single resonating member. Further, while the ends of the resonating members 103 are shown as being free, one or both of them may alternatively be attached to the base structure.

Figure 10:
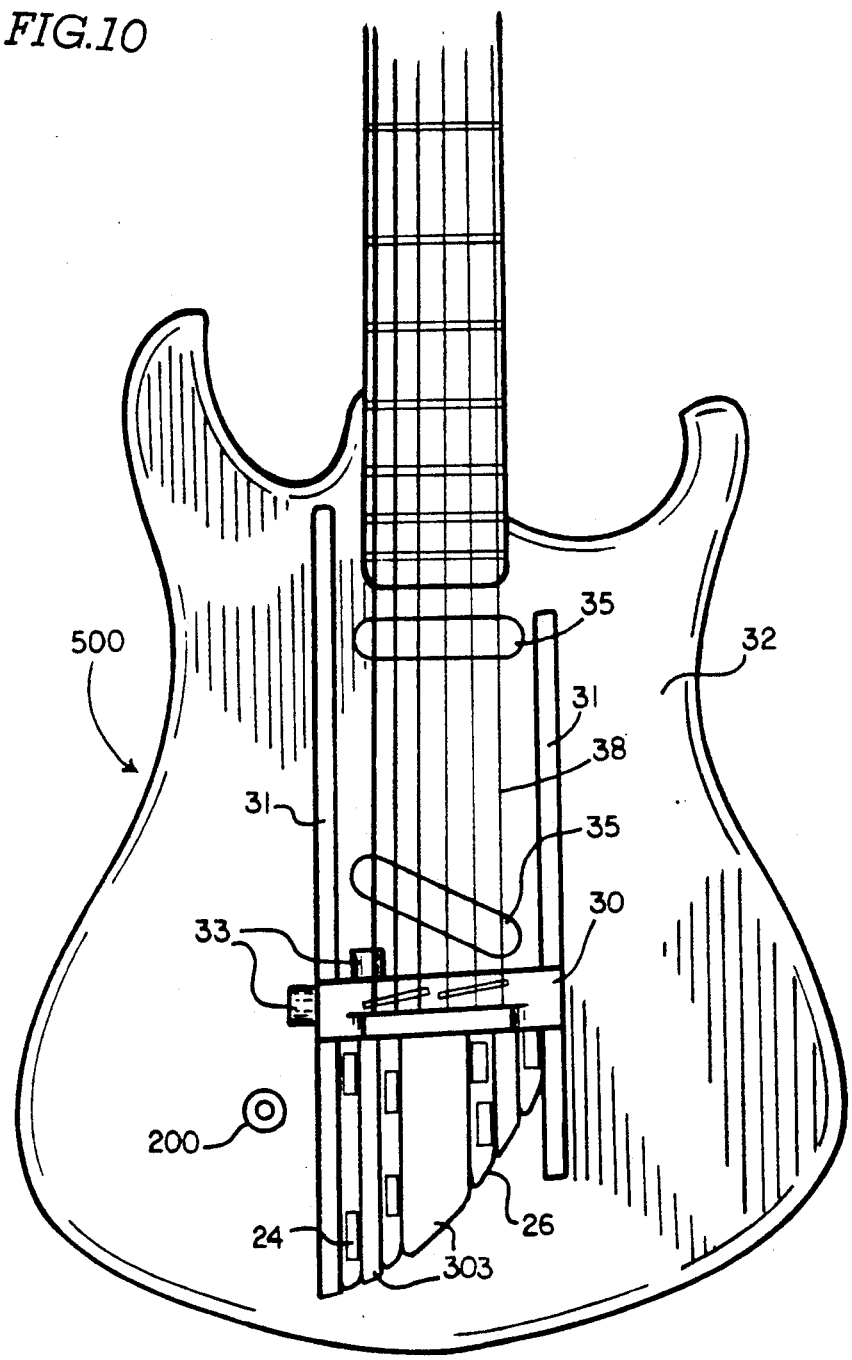
FIG. 10 is a partial plan view of a guitar of the ninth embodiment of the invention.

In the ninth embodiment shown in FIG. 10 a guitar 500 employing a transducer system similar in principle to the one set out in the eighth embodiment is shown. The head of the guitar is of a well known construction and is deleted from the drawing for simplicity. The resonators 303 correspond to those 103 in the eighth embodiment and are attached to a bridge 30 which is supported on support members 31 the ends of which are supported on the body 32 of the guitar 500, which corresponds to the base member 29 of the eighth embodiment. Coils 26 are provided on the resonator members and the strings 38 of the guitar when excited manually, provide the vibraton input to the bridge 30 and resonating members 303. The support members 31 are of mutually different lengths to provide them mutually different resonating characteristics and, although it cannot be seen clearly from FIG. 10 the central sections thereof are suspended above the body of the guitar 500 and only the ends are attached. A secondary microphone 200 is provided on the body of the guitar 500 to pickup vibrations thereof. Experiment by the inventer has shown that the signal output of the coils 26 combined with that of the of the secondary mike 200 when amplified via an appropriate amplifier produce a sound virtually indistinguishable from that of a fine acoustic guitar.

Additional mikes 33 formed in accordance with one of the above disclosed embodiments of the invention and arranged so as to pickup vibrations of a resonating member such as the bridge 30 in the lateral and/or longitudinal axes of the guitar 500, may also be provided.

The shape and material of the resonator members 303 may be selected at will according to the resonating characteristics desired.

Additional to the transducers according to the invention conventional electric guitar pickups 35 may be provided on the body 34 of the guitar 500 thus providing a high degree of versatility in the signal output of the guitar. If so desired separate circuitry and output jacks (not shown) for the conventional pickups 35 and the transducers according to the invention may be provided on the guitar so that the outputs of the transducers according to the invention may processed separately from those of the conventional pickups of the guitar.

Figure 11:
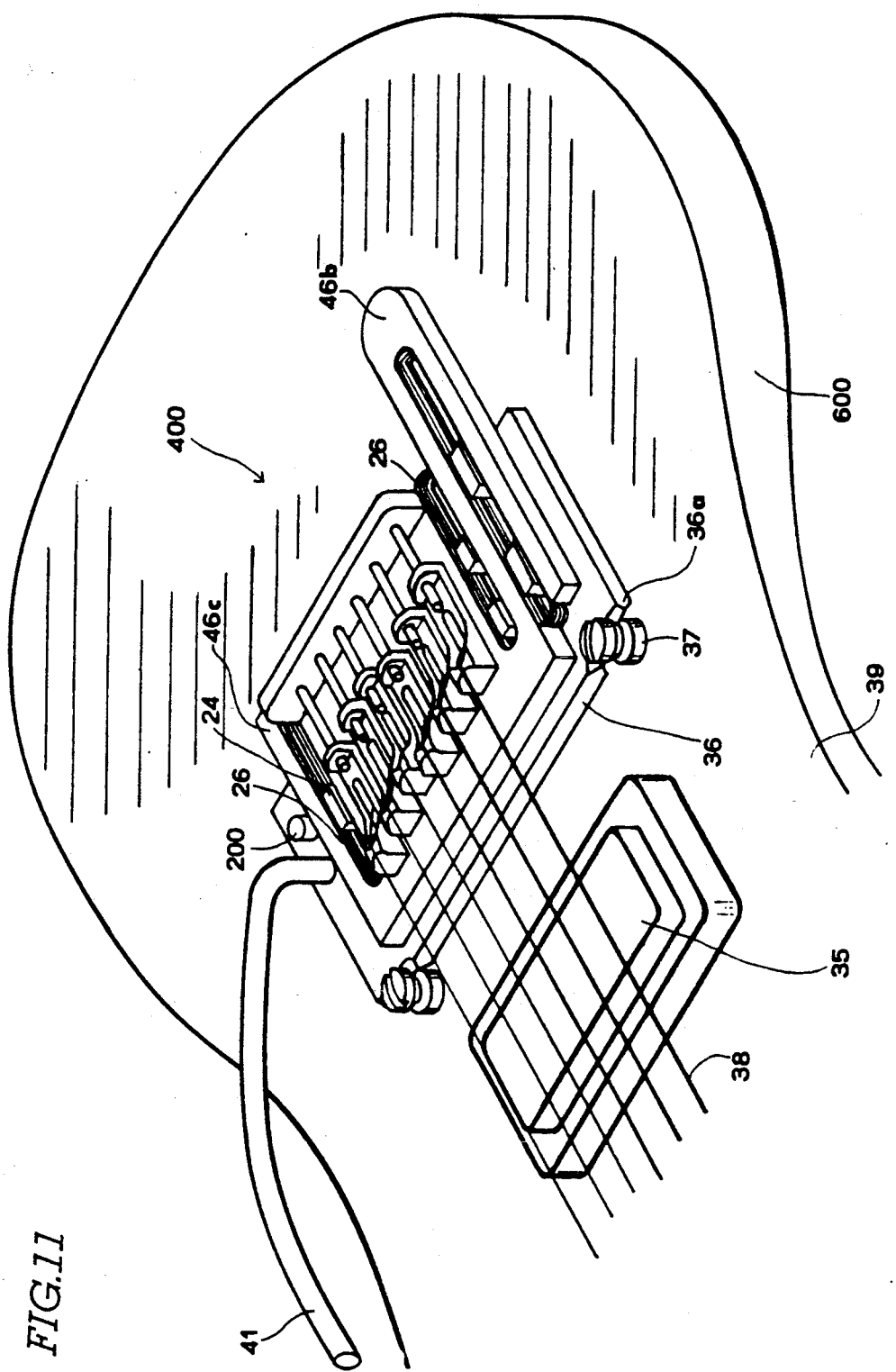
FIG. 11 is a perspective view showing a guitar bridge comprising a transducer according to the tenth embodiment of the invention.
Figure 12:
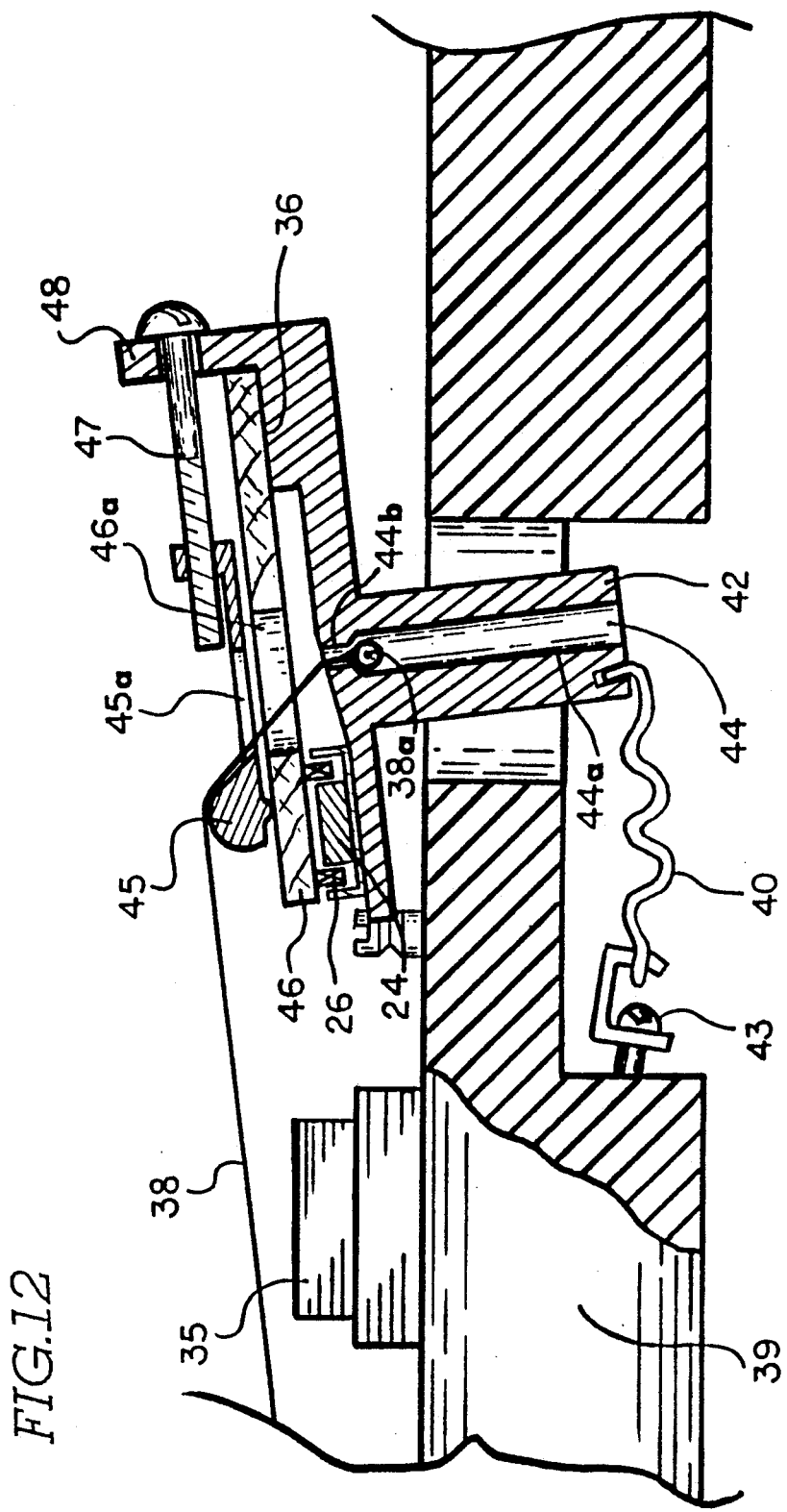
FIG. 12 is a cutaway view of the guitar bridge of FIG. 11.

In a tenth embodiment shown in FIGS. 11 and 12 a resonating transducer employing the principles set out in the eighth and ninth embodiments is formed directly on a tremolo tail piece 400 of an electric guitar 600.

The basic configuration of the tail piece 400 is similar to that of the most commonly used A tremolo tail pieces. As can be seen from FIGS. 11 and 12 the tail piece 400 comprises a generally planar member 36 having wedge shaped portions 36a which are driven into engagement with grooved supporting screws 37 by which the bridge 400 is adjustably supported on the body 39 of the guitar 600, by the tension of the guitar strings 38 and a counter tension spring 40. A handle or "arm" 41 by which the tail piece 600 may manually oscillated, is provided. A downwardly projecting portion 42 at the bottom of the "plate" 36 receives an end of the spring 40 and the other end thereof is attached to the body 39 via a screw 43 for example. A hole 44 having a larger portion 44a and a smaller portion 44b is provided for retaining a ball end 38a of a guitar string 38. Adjustable bridge saddles 45 of well known configuration, are supported on a generally planar resonator member 46 and and biased into engagement therewith by the tension of the the strings 38 which are passed from the retaining holes 44, through slots 46a in the resonator member 46, through slots 45a in the bridge saddles and accross the crests of the bridge saddles to a tuner (not shown) of a known construction. As in conventional bridges well known in the art the positions of the bridge saddles 45 may be adjusted by means of adjuster screws 47 supported on an ear at the rear end of the tail piece and threaded into the bridge saddles 45.

The rear side of resonator member 46 is screwed and or adhesively attached on a step 36a formed on the plate 36. The front side of the resonator is unsupported and can be excited into vibration by the vibration of the strings 38 transmitted thereto via the bridge saddles 45. The characteristics of vibration of the resonator 46 are determined largely by its modulus of elasticity, length, and thickness. Provided at plural positions of the bridge assembly 400 are coils 26 formed on the resonator 46 and magnets arranged in the proximity of the coils. The magnets may be retained on the bridge assembly via ferrous channel members 25 similar to those disclosed in the eighth embodiment.

As can be best appreciated from FIG. 11 the resonator member may comprise sections whose configuration makes them more resonantly responsive to lower resonating frequencies. As is well known in the art one method of achieving low resonating frequencies is to increase the length of the resonating member, the inventor has found that this can be effectively achieved without excessively increasing the size of the resonating member by forming the resonator member with sections that "fold back" on themselves as does the U-shaped section 46b of the resonator 46 shown in FIG. 12. In between the legs of the U is formed a coil 26 and as in the eighth embodiment magnets 24 are supported on the plate 36 so as to project within the coil 26. A coil 26 may also be formed between the U-shaped section 46a and the main portion of the coil. A leg 46c is also provided at the other side of the resonator member 46 and a coil 26 is formed between the leg 46c and the main portion of the resonator member 46 in which magnets are provided.

As in the eighth embodiment a secondary mike 200 may be provided for picking up vibration of the plate 36 and the signal thereof may be added to those of the coils 26.

Thus the resonator member 46 has a variety of mutually different resonating characterisics at various sections thereof and by selective arrangement of the magnets within the coils 26 characterisics of their outputs in response to the vibration of the resonator can be selectively adjusted at will.

The bridge saddles 45 may be formed of metal as is the conventional practice or of a hard lightweight substance such as bone, plastic, graphite or etcetera which allows more of the vibrational energy of the strings 38 to be transmitted to the resonator member 46.

Thus as will be appreciated by one skilled in the art a tremolo tail peice comprising a resonator transducer according to the tenth embodiment may be formed as a direct replacement part for assembly in guitars formed so as to accomodate a currently common variety of tremolo tail peice with little or no modification to the body thereof.

Further, although for the sake of simple disclosure the bridge assembly of the shown embodiment is a simple type however as will be apparent to those skilled in the art the bridge assembly may comprise tuners as in known bridge assemblies of this general configuration.

Figure 13:
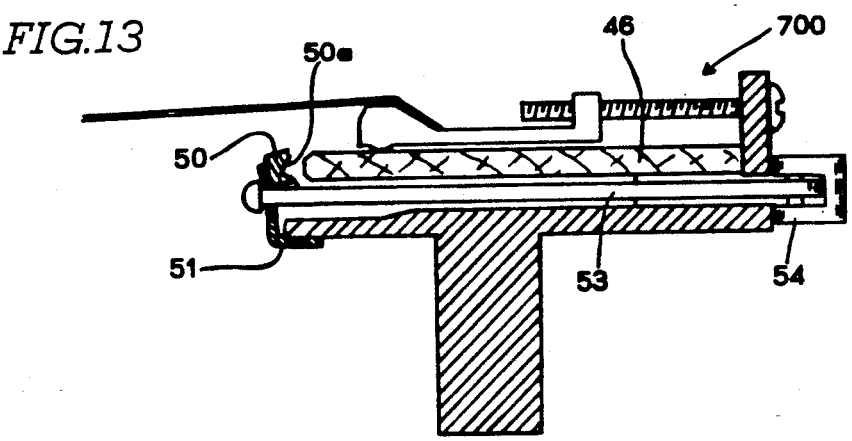
FIG. 13 is a cutaway view of a guitar bridge according to the eleventh embodiment of the invention.
Figure 14:
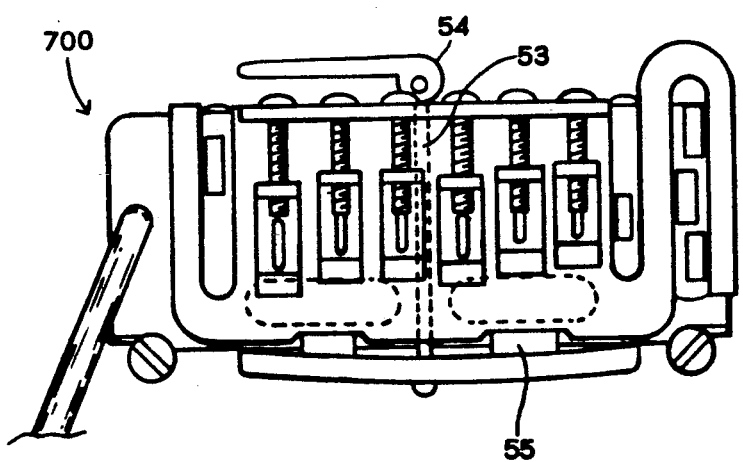
FIG. 14 is a plan view of the guitar bridge of FIG. 14.

In the eleventh embodiment shown in FIGS. 13 and 14 a variable damping member 50 is provided on a bridge assembly otherwise similar to that shown in FIGS. 11 and 12.

This variable damping member 50 provides two functions, one being to provide yet another variable parameter for adjusting the characteristics of the signal output of the coils 26 formed on the resonator member by adjusting the resonating characterisics of the resonating member, and the other being to provide a mode wherein the amount of vibrational energy of the strings 38 lost in causing the resonator to vibrate is reduced and thus the string's "sustain" characteristics are similar to those obtained with conventional bridges.

To acheive the above aims the variable damping member 50 of the eleventh embodiment is provided at the front edge of the tail peice 700 which is in almost all other respects similar to that depicted in the above tenth embodiment. The damping member 50 is supported on the plate 36 by a leaf spring 51 which biases it away from the front edge of the resonator 46.

The variable damping member 50 is coupled, at its central portion, with the end of a rod member 53 coupled at its other end to a cam member 54. The biasing force of the leaf spring 51 maintains tension in the rod 53 which keeps the cam member firmly engaged with the rear end surface of the bridge assembly 700 in this way engaging tension is maintained and "rattling" is avoided.

The cam member 54 is actuable for bringing the variable damping member into engagement with the front edge of the resonator member. The variable damping member may comprise resilient damping pads 55, composed of a material such as felt, which are the first portion thereof to come into engagement with the front edge of the resonator 46 when the damping member 50 is actuated into engagement via the cam 54. When damping pads 55 are in light engagement with the front edge of the resonator member their damping effect is relatively small. As the cam 54 is actuated further towards the full engagement position (clockwise in FIG. 14) pads 55 become increasingly compressed and the damping of the resonator member 46 increases, and, due to the compression thereof, the rigidity of the resonator member also tends to increase.

As the cam is still further rotated, the walls of the groove 50a in the damping member 50 come into direct solid engagement with the resonator member with the effect that the front end of the resonator, 46 which has now become somewhat rigid because of the compressive stress exerted thereon, is directly coupled via the leaf spring to the front end of plate 36. In order to provide the maximum vertical rigidity in this position the leaf spring 51 is so configured that it becomes substantially flat when the groove 50a is in engagement with the front edge of the resonator member 46.

The damping member 50 may be formed with a slight bow so that it must become slightly elastically deformed by the engaging force of the cam 54 exerted at the center thereof via the rod 53 in order to engage the entire front edge of the resonator 46 in this way solid engagement at the ends of the damping member with the front edge of the resonator 46 may be assured.

The net effect of this rigid coupling is that the structure on which the bridge saddles are supported becomes a solid, rigid mass which absorbs less of the vibrational energy of the strings 38 thereby allowing them to vibrate longer thus producing the sustain that is characteristic of conventional electric guitars, in the fully engaged mode of the damping member 50.

Although in the disclosed embodiment a cam 54 is provided it will be appreciated that essentially the same effect could be acheived by providing a threaded section at the rear end of the rod 53 and using a finger nut in place of the cam 54.

It will be appreciated that the above disclosed configuration is intended as an example and that various configurations are possible for the damping member, and further, that embodiments not comprising a tremolo bridge wherein a resonator/transducer is provided may also benefit from damping.

Figure 15:
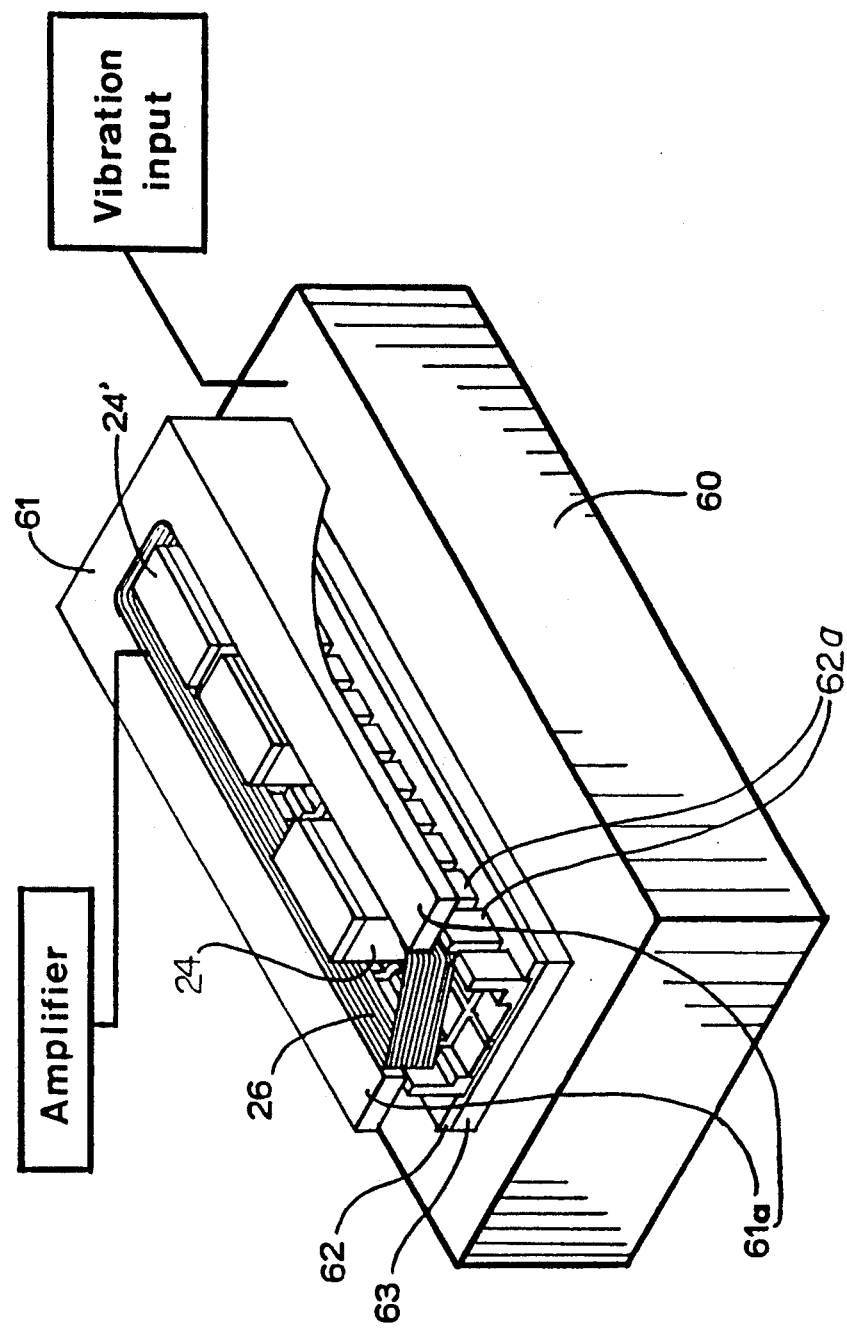
FIG. 15 is a perspective explanatory depiction of a transducer according to the twelfth embodiment of the invention.

In FIG. 15 yet another embodiment of the instant invention is explanitorily depicted.

The transducer 61 of the twelfth embodiment is rigidly fixed to a surface of a vibrating member 60 so as to vibrate therewith. The transducer 61 comprises a pair of legs 61a having mutually different resonating characteristics and extending parallel to the surface of the of the vibrating member 60. Formed on the opposing inner faces of the resonating members is a coil 26 and resiliently supported therewithin is one or a plurality of magnets 24.

Magnets 24 are supported on a chanelled ferrous member 62, which in turn is supported on the surface of the vibrating member 60 via a buffer layer 63 of resilient foam or felt. Thus by the effect of the buffer layer 63 vibrations of the surface of the vibrating member 60 are for the most part prevented from being transmitted to the magnets 24.

In order to provide an intense magnetic field at selected portions of the coil discrete, essentially L-shaped yoke members 62a may be provided on the support member 62. The yoke members 62a may be arranged such that when one of the magnets 24 is disposed an one of the yoke members 62a the magnetic flux of the particular magnet is concentrated in that portion of the coil closest to the particular yoke 62a on which the magnet is disposed.

The polar ends of the magnets may also comprise ferrous plates 24' which function as yokes.

In this manner when a plurality of magnets is disposed within the coil, since the fluxes of the respective magnets are defined separately by separate yokes, polarity of the magnets may be mutually opposite without the magnetic field of one of the magnets substantially effecting that of the others.

The vibrations of the transducer 61 are, for the most part, unmodulated relative to those of the vibrating member at the end of the transducer 61 at which it is attached to the surface of the member 60, and are modulated increasingly towards the unsupported ends of the resonating members 61a so that the characterisics of the inductively produced signals generated in the coil 26 vary according to the positioning of the magnets within the coil.

In the depicted embodiment of FIG. 15 the channelled member is given a broad base so as to reduce any tendency of the magnets 24 to sway within the coil.

Thus it becomes possible to effectively amplify and or phase cancel isolated sections of the resonating member by arranging the magnets selectively within the coil.

As will be apparent, the vibrating characeristics of the legs 61a may be easily adjusted by damping them with foam or other resilient material or by wedging a block of some hard substance between the surface of the resonating member 60 and a central portion of the leg to be adjusted.

An example of the use to which the transducer of the twelfth embodiment may be applied would be to fasten it to a vibrating surface of an electric guitar. Experiment shows that amplifying the output of the transducer when so applied produces a sound somewhat similar to the sound produced by an accoustic guitar although it is not as similar as the signals obtained with the transducers of the tenth and eleventh embodiments.

When the transducer of the twelfth embodiment is to be so applied it will be appreciated by those skilled in the art that the respective legs 61a should not generally be formed as to resonate too strongly at any one particular frequency as this would tend to cause notes of that particular frequency played on the guitar to dominate the signal output by the coil.

Figure 16:
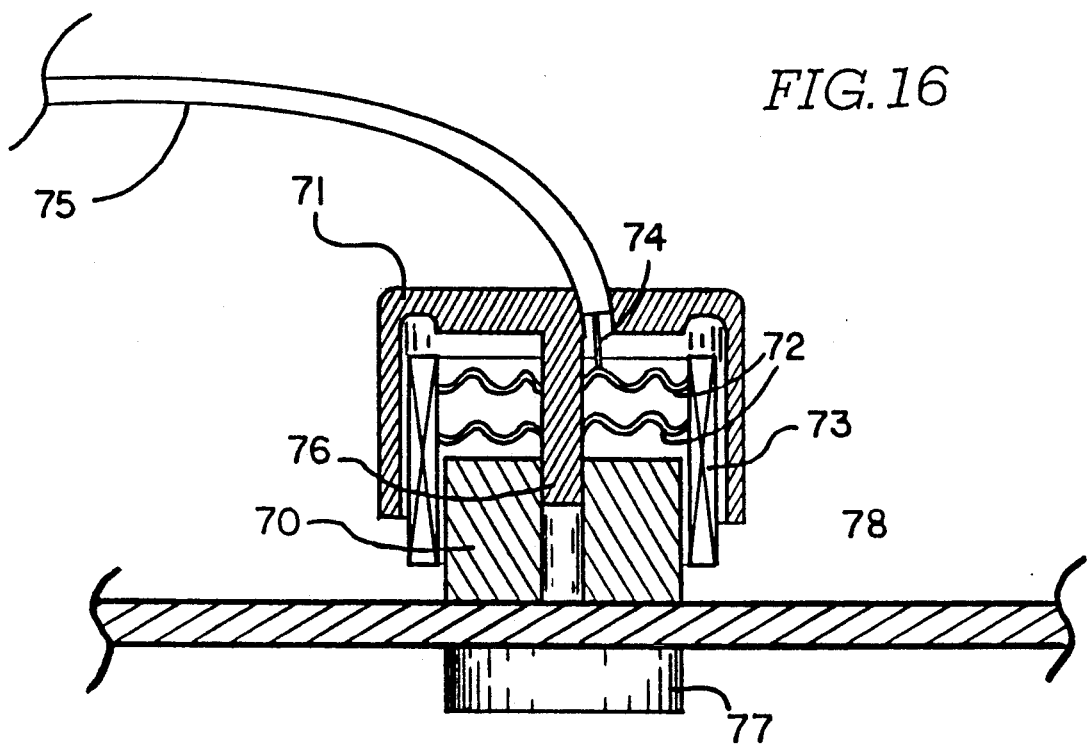
FIG. 16 is a cutaway view of a transducer according to the thirteenth embodiment of the invention.

In the thirteenth embodiment, shown in FIG. 16, instead of attaching the coil to the surface to be miked and suspending the the magnet as in the previous embodiments, the magnet is engaged directly with the vibrating surface to be miked and the coil is resiliently supported thereon. In this way it becomes possible to magnetically retain the mike on the surface to be miked, thereby facilitating easy adjustment of the position of the mike on the surface.

Referring to FIG. 16 the transducer of the thirteenth embodiment comprises a magnet 70, a protective cap 71 fixed to the magnet 70 via a centrally formed rod 76, and a coil 73 elastically suspended in the space around the magnet by a pair of elastic webs 72 essentially similar to the type commonly employed in loud speakers. The leads 74 of the coil may be attached to a shielded cord 75 leading from the cap 71.

The cap 71 may be formed of ferrous material so as to function as a magnetic yoke.

With this configuration the coil 73 is suspended in close proximity to the magnet 70 and is stable in the axes perpendicular to the rod 76 but can resiliently move within cap 71 along the long axis of the rod 76. If the vibrating member 78 does not comprise a ferrous material, the mike can be retained on the surface of the vibrating member 78 to be miked by, for example, providing a magnet 77 at the back side of the member 78 to which the magnet 70 can become magnetically attracted if the resonating member does comprise a ferrous material, this may of course be unecessary.

Thus, as can be appreciated, vibration of the member 78 is transmitted directly to the magnet 70 the rod 76 and the cap 71, the coil 72 however remains relatively stationary by virtue of its own inherent inertia since it is only resiliently coupled to the rod 76. Thus vibration of the magnet 70 in the vicinity of the coil produces an alternating electrical current in the coil, analogeous to the vibration of the member 78, which may be output to a signal processing means (not shown) via the leads 74 and the cable 75.

The cap 71 serves to protect coil 73 and diaphrams 72 from damage.

Figure 17:
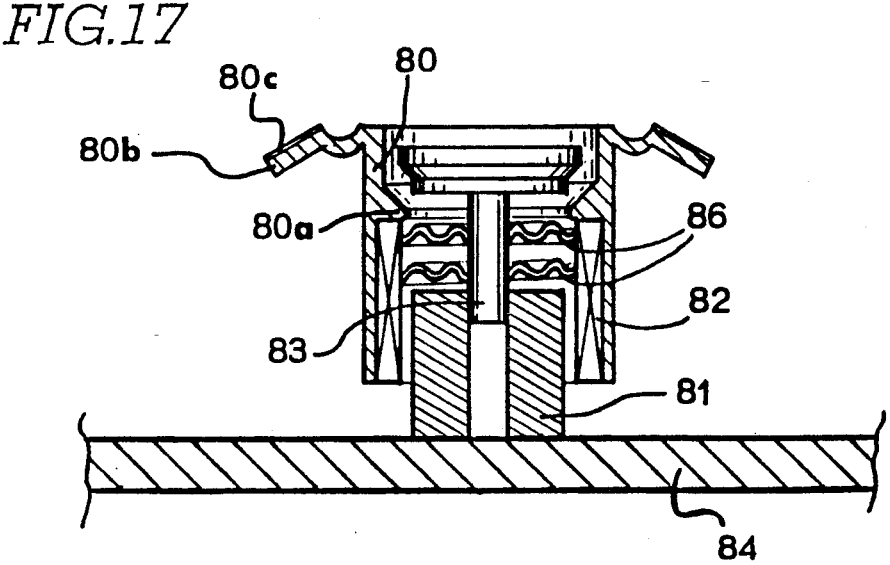
FIG. 17 is a cutaway view of a transducer according to a fourteenth embodiment of the invention.

In FIG. 17 the fourteenth embodiment is depicted. The mike according to the fourtheenth embodiment is reversable in the sense that either the coil 82 or the magnet 81 may be egaged with the surface to be miked. In the orientation shown in FIG. 18 the magnet 81 is arranged on the surface to be miked and the the coil 82 is supported, similarly to the thirteenth embodiment, via a pair of diaphrams 86 attached to a rod 83 supported in the central portion of the magnet 81. A casing 80 is formed about the coil 82. The casing comprises an inner annular engaging surface for engaging an annular surface of a disc shaped member 85 formed on the top of the rod 83. In this way when the mike is to be removed from a surface to which it is magnetically attracted as it is pulled via the casing away from the surface 84 the diaphrams 86 elastically deform until a point is reached where the engaging surface 80a engages the disk 85 and upward and or lateral force applied to the casing 80 is applied directly to the magnet 81 via the rod 83 thus avoiding damage to the relatively delicate diaphrams 86.

As can be appreciated from the figure the upper end of the casing 80 protrudes further than the disk 85 attached to the magnet 81 therefore the mike may easily be turned over and the upper edge of the casing may be engaged on the surface 84 to be miked, in this state the magnet 81 becomes the sprung mass. As in the third embodiment elastically deformable ears 80b comprising an adhesive layer 80c may be provided on the casing 80 for holding the casing in engagement with the surface 84 to be miked.

Figure 18:
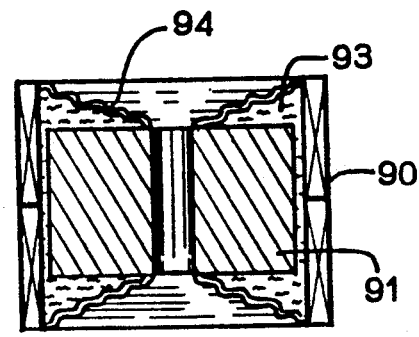
FIG. 18 is a cutaway view of a transducer according to the fifteenth embodiment of the invention.

The fifteenth embodiment is shown in FIG. 18. The fifteenth embodiment is basically similar to any of the first four embodiments exept that the inner circumference of the coil structure 90 is only very slightly larger than the outer circumference of the magnet 91 so that the two members are in slidable contact with each other. In this embodiment the diphram serves to define a liquid tight chamber 93 in which a lubricant such as a very light oil is disposed. The engaging surfaces of the magnet 91 and the coil 90 are formed as accurately cylindrical as possible so as to assure that the magnet 91 may slide freely and silently within the coil 90.

Thus in the mike according to the fifteenth embodiment, since the magnet 91 is in extremely close proximity to the coil 90 a very strong signal can be generated therein in accordance with vibration of the surface to be miked.

Figure 19:
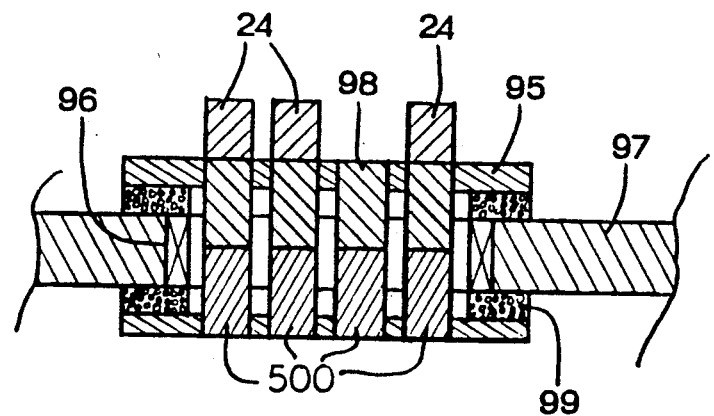
FIG. 19 is a cutaway view of a transducer according to the sixteenth embodiment of the invention.

In the sixteenth embodiment of the invention an oblong coil 96 is formed on the walls of an oblong slot in a vibrating member 97 and a pair of oblong flanges shown in crossection in FIG. 19 supported on the resonating member via a pair of resilient oblong rings 99 and connected to each other via iron pole pieces 98 and nonferrous bridge members 500.

Thus the pole pieces 98 are resiliently suspended within the space defined by the coil and when the member 97 is vibrating the coil 96 vibrates therewith in the proximity of the pole pieces 98 which remain substantially stationary, and by placing magnets 24 on the ends of the pole pieces magnetic fields can be formed around the pole pieces 98, which produce current in the coil via electro-magnetic induction. The magnets can be selectively arranged on the pole pieces so as to adjust the configuration and polarity of the magnetic field at various positions of the coil.

The pole pieces may project halfway or less into the coil and the nonferrous bridge members 500 may be provided for linking the pole pieces to the lower half of the support member.

Figure 20:
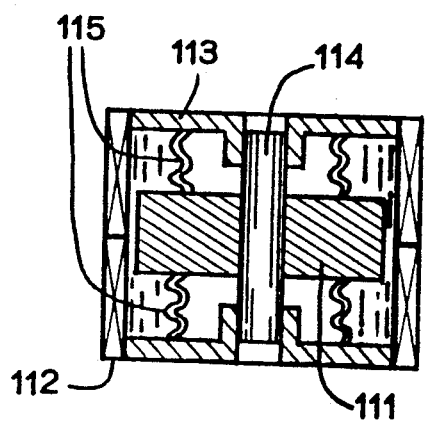
FIG. 20 is a cutaway view of a transducer according to the seventeenth embodiment of the invention.

In the seventeenth embodiment shown in FIG. 20, a magnet 111 is suspended within a coil 112 via a rigid webbing 113 having a hole in which a rod 14 is slidably supported. The rod 114 is rigidly fixed to the magnet 111 and resilient members 115 are provided for resiliently centering the magnet 111 between the two ends of the coil. Thus as in the other above described embodiments the magnet is resiliently supported in the axial direction of the coil 111 but is rigidly restricted from lateral movement therewithin allowing the magnet to be precisely aligned within the coil.

Figure 21:
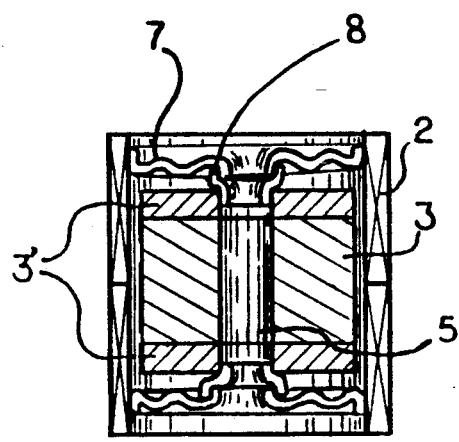
FIG. 21 is a cutaway view of a transducer according to the eighteenth embodiment of the invention.

The eighteenth embodiment shown in FIG. 21 is essentially identical to the second embodiment of the invention shown in FIG. 3 except that on the upper and lower sides of the magnet 3 washer shaped ferrous yoke members 3' are provided for concentrating the magnetic field in the upper and lower segments of the coil.

Figure 22:
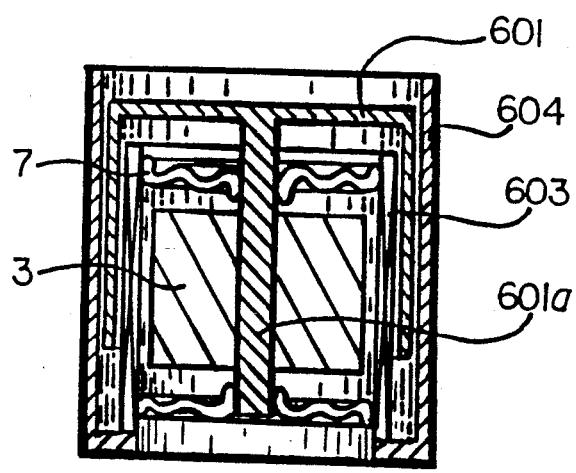
FIG. 22 is a cutaway view of a transducer according to the nineteenth embodiment of the invention.

In the nineteenth embodiment shown in FIG. 22 a ferrous yoke 601 is provided. The yoke 601 comprises a rod portion 601a by which it is rigidly attached to the magnet 3. The yoke 601 and magnet 3 are resiliently attached to the coil 603 via resilient diaphrams 7. Thus the magnet 3 and yoke 601 are resiliently suspended in such a manner as to concentrate a magnetic flux within the coil 603.

The coil 3 is rigidly attached within a protective casing 604 either end of which may be engaged with a member to be miked.

It will be appreciated by those skilled in the art that above disclosed embodiments are intended as examples for illustrating the principles of the invention and are not intended to imply limitations to the invention and that numerous variations on and recombinations of the elements of the various above described embodiments of the invention are possible within the scope and spirit set out in the appended claims.

What I claim is:

1. A transducer for producing an alternating current electrical signal corresponding to the vibrations of a vibrating member to be miked comprising:
    a coil, said coil being rigidly coupled to said vibrating member so as to be synchronously vibratable therewith, said coil consisting of a plurality of turns of a conductive filament;
    a magnet, said magnet being resiliently suspended within said coil so as to be isolated from the vibrations of said vibrating member;
    a resilient member, said resilient member defining means for supportively and elastically coupling said magnet to said coil for insulating said magnet from vibration of said coil and said vibrating member, and for allowing relative movement between said magnet and coil for electro-inductively producing said alternating current signal in said coil, in response to vibration of coil due to vibration of said vibrating member.

2. A transducer as set forth in claim 1 wherein said resilient member is defined by a substantially elastic resilient diaphram.

3. A transducer as set forth in claim 2 wherein said resilient member is comprised of a layer of a resilient material disposed between said magnet and said vibrating member.

4. A transducer as set forth in claim 3 wherein said magnet is supported on a ferrous member which is supported on said layer of resilient material.

5. A transducer as set forth in claim 4 wherein said coil is substantially oblong.

6. A transducer as set forth in claim 5 wherein the general position of said magnet relative to said coil, said general position being defined as the specific area within which said magnet moves relative to said coil in.

response to a given vibrational input to said transducer, is selectively alterable.

7. A transducer as set forth in claim 5 wherein a plurality of magnets are provided within the area enclosed by said coil.

8. A transducer as set forth in claim 7 wherein the positional and polar orientation of individual magnets, of said plurality of magnets, with respect to said coil, may be selectively altered.

9. A transducer as set forth in claim 7 wherein said magnets are arranged on pole pieces projecting within said coil.

10. A transducer as set forth in claim 1 wherein said magnet is supported within said coil via said resilient member and said resilient member resiliently permits relative movement between said coil and said magnet in a first axis defined by a line intersecting the north and south poles of said magnet and restricts movement therebetween in a second axis which is normal to said first axis.

11. A transducer as set forth in claim 10 wherein said resilient member defines one of a plurality of resilient diaphrams said plurality of resilient diaphrams defining means for resiliently supporting said magnet.

12. A transducer as set forth in claim 1 wherein said magnet is exclusively supported via said resilient member.

13. A transducer as set forth in claim 1 wherein said resilient member is defined by a vibrating surface of a musical instrument.

14. A transducer as set forth in claim 1 wherein said coil is arranged on a member rigidly coupled to said vibrating member so as to vibrate therewith and said member rigidly coupled to said vibrating member comprises a resonator member on which resonator member a section of said coil is arranged, said resonator member being operable for modulating the vibrations of said coil with respect to said vibrating member.

15. A transducer as set forth in claim 1 wherein said transducer is selectably operable in a first mode wherein said magnet is arranged as a sprung mass resiliently supported via said resilient member on said coil and said coil is directly mechanically coupled to said vibrating member to be miked to be vibrated therewith, and a second mode wherein said coil is arranged as a sprung mass resiliently supported via said resilient member on said magnet and said magnet is directly mechanically coupled to said vibrating member to be vibrated therewith.

16. A transducer as set forth in claim 1 formed integrally with a vibrating member of a musical instrument.

17. A transducer as set forth in claim 1 wherein said coil is separated into discrete segments in such manner that said discrete segments may be wired in opposite phase.

18. A transducer as set forth in claim 1 wherein a ferrous yoke is coupled with said magnet for concentrating magnetic flux of said magnet in said coil.

19. A contact microphone comprising:
a rigid coil, said rigid coil being of electrically conductive material, said rigid coil defining an enclosed space of a first length measured along an axis normal to the windings of said coil, for being coupled to a vibrating surface so as to vibrate therewith;
a magnet, said magnet having a smaller length between ends defining its poles than said first length;
a first resilient member, said first resilient member being attached to one end of said coil for supporting one end of said magnet at a central portion thereof; and
a second resilient member, said second resilient member being attached to the other end of said magnet at a central portion thereof for cooperating with said first resilient member to retain said magnet in alignment within said coil and isolated from vibrations of said vibrating member along the north-south axis of said magnet.

20. A contact microphone comprising:
a transducer element for contacting a surface of an instrument so as to vibrate therewith;
a holder means, said holder means having an adhesive portion for adhering to a surface to be miked;
a resilient depressor means, said resilient depressor means being elastically distorted when said adhesive portion is caused to adhere to said surface to be miked, said resilient depressor means defining means for resiliently urging said transducer element into rigid contact with said surface to be miked.

21. A transducer for producing an alternating current signal corresponding to the vibrations of a vibrating member to be miked comprising:
a coil, said coil consisting of a plurality of turns of a conductive filament;
a magnet surrounded by said coil; and
resonant electronic element support means, said resonant electronic element support means supporting one of said magnet and said coil so as to allow relative movement between said magnet and said coil in response to vibration of said vibrating member, said electronic element support means being defined by a resilient resonator member by which said magnet and said coil are elastically coupled to each other, said resilient resonator member being operable for modulating the vibration of said coil relative to said magnet for determining the tonal characteristic of the signal output of said transducer.

22. A transducer as set forth in claim 21 wherein said coil is supported on said electronic element support means.

23. A transducer as set forth in claim 22 wherein said magnet is supported on a substantially rigid support structure.

24. A transducer as set forth in claim 21 wherein said resilient resonator member is composed of a plurality of resonator sections.

25. A transducer as set forth in claim 21 wherein a plurality of resonator sections are defined by said resilient resonator member.

26. A transducer as set forth in claim 21 wherein said resonant electronic element support means defines a support means for supporting a vibrating element of a musical instrument, with respect to a support structure of said musical instrument, and said vibrating element of said musical instrument defines said vibrating member to be miked.

27. A transducer for producing an alternating current signal corresponding to the vibrations of a vibrating member of a musical instrument comprising:
a coil, said coil consisting of a plurality of turns of a conductive filament;
a magnet, said magnet being surrounded by said coil;

saddle support means, said saddle support means resiliently supporting a vibrating member of said musical instrument; and electronic element support means, said electronic element supporting means supporting one of said magnet and said coil so as to allow relative movement between said magnet and said coil in response to vibration of said vibrating member, said saddle support means and said electronic element support means being defined by in common a resilient resonator member by which one of said magnet and said coil is supportively elastically coupled to a substantially rigid support structure and said substantially rigid support structure supports the other one of said coil and said magnet.

28. A transducer as set forth in claim 27 wherein said resilient member is defined by a vibrating surface of said musical instrument.

29. A transducer as set forth in claim 27 wherein said magnet is arranged on a pole piece projecting within said coil.

* * * * *